(12) United States Patent
Ziskin

(10) Patent No.: US 9,787,735 B2
(45) Date of Patent: Oct. 10, 2017

(54) METHODS, DEVICES, AND SYSTEMS FOR LIVE VIDEO STREAMING FROM A REMOTE LOCATION BASED ON A RECEIVED REQUEST UTILIZING KEEP ALIVE MESSAGES

(71) Applicant: Drop In, Inc., Los Angeles, CA (US)

(72) Inventor: Louis Ziskin, Playa del Rey, CA (US)

(73) Assignee: DROP IN, INC., Los Angeles, CA (US)

( * ) Notice: Subject to any disclaimer, the term of this patent is extended or adjusted under 35 U.S.C. 154(b) by 0 days.

(21) Appl. No.: 15/249,308

(22) Filed: Aug. 26, 2016

(65) Prior Publication Data

US 2017/0063947 A1    Mar. 2, 2017

Related U.S. Application Data

(60) Provisional application No. 62/210,850, filed on Aug. 27, 2015, provisional application No. 62/249,094, filed on Oct. 30, 2015.

(51) Int. Cl.
*H04L 29/06* (2006.01)
*H04L 29/08* (2006.01)
*H04L 12/751* (2013.01)

(52) U.S. Cl.
CPC ........ *H04L 65/4076* (2013.01); *H04L 45/026* (2013.01); *H04L 63/08* (2013.01); *H04L 65/4084* (2013.01); *H04L 65/60* (2013.01); *H04L 65/80* (2013.01); *H04L 67/18* (2013.01)

(58) Field of Classification Search
CPC .... H04L 65/4076; H04L 45/026; H04L 65/60
See application file for complete search history.

(56) References Cited

U.S. PATENT DOCUMENTS

| | | | | |
|---|---|---|---|---|
| 9,462,028 | B1* | 10/2016 | Levinson | H04L 65/602 |
| 2007/0036100 | A1* | 2/2007 | Shaffer | H04W 4/021 |
| | | | | 370/328 |
| 2009/0284348 | A1* | 11/2009 | Pfeffer | G08B 25/006 |
| | | | | 340/7.3 |
| 2010/0250678 | A1 | 9/2010 | Hu et al. | |
| 2011/0099372 | A1* | 4/2011 | Annapureddy | H04N 21/632 |
| | | | | 713/168 |

(Continued)

OTHER PUBLICATIONS

International Search Report for PCT Serial No. PCT/US136/49125 mailed Jan. 26, 2017.

*Primary Examiner* — Jerry Dennison
(74) *Attorney, Agent, or Firm* — Brooks Acordia IP Law, P.C.; Pejman Yedidsion

(57) ABSTRACT

Systems, devices, and methods for streaming video data being recorded once an operator user equipment is in the location specified by a requester user equipment based on selecting the operator user equipment from a determined set of one or more user equipment that may be based on a received acknowledgement message from the operator user equipment that the request was accepted and a set of criteria. In some embodiments, determining by the computing device the set of one or more user equipment to send the request to may be based on the received request and connectivity status. Additionally, the streaming may be based on a request from the requester user equipment being sent to a computing device for dispatching the operator user equipment.

18 Claims, 9 Drawing Sheets

(56) References Cited

U.S. PATENT DOCUMENTS

| | | | |
|---|---|---|---|
| 2013/0007788 A1* | 1/2013 | Levinson | H04N 7/18 725/13 |
| 2014/0052828 A1* | 2/2014 | Mousseau | H04L 65/605 709/219 |
| 2014/0136726 A1 | 5/2014 | Van Wie et al. | |
| 2014/0373124 A1 | 12/2014 | Rubin et al. | |
| 2015/0032858 A1* | 1/2015 | Motrenko | H04L 51/10 709/219 |
| 2016/0042767 A1* | 2/2016 | Araya | G11B 19/02 386/201 |
| 2016/0066163 A1* | 3/2016 | Agulnik | H04W 4/02 455/404.1 |

* cited by examiner

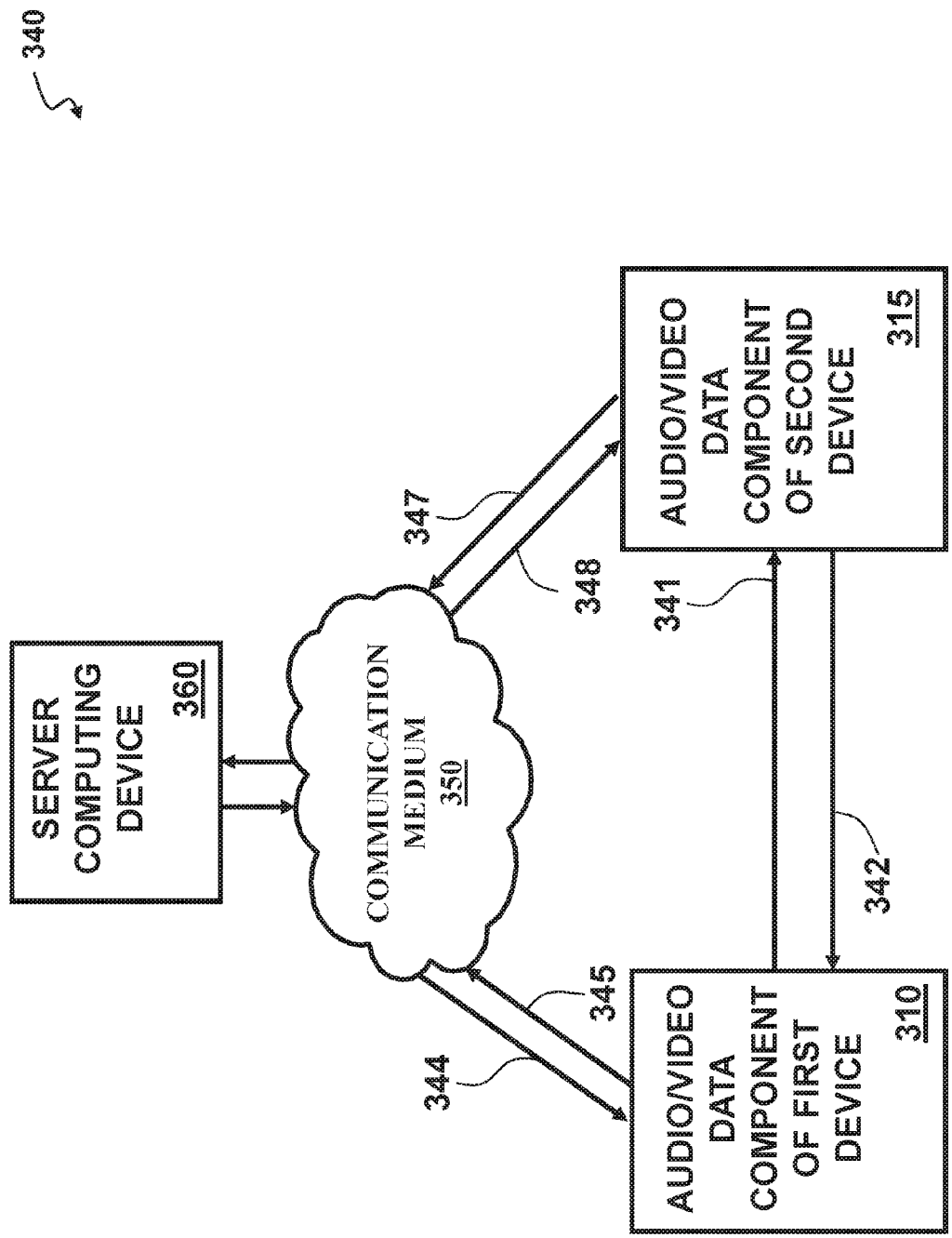

METHODS, DEVICES, AND SYSTEMS FOR LIVE VIDEO STREAMING FROM A REMOTE LOCATION BASED ON A RECEIVED REQUEST UTILIZING KEEP ALIVE MESSAGES

CROSS-REFERENCE TO RELATED APPLICATIONS

This application claims priority to and benefit of Provisional Patent Application No. 62/210,850 filed Aug. 27, 2015 and Provisional Patent Application No. 62/249,094 filed Oct. 30, 2015, both of which are hereby incorporated by reference for all purposes.

TECHNICAL FIELD OF ENDEAVOR

The field of the invention relates to on demand video streaming systems, and more particularly, to methods and devices for providing live video streaming from a remote location.

BACKGROUND

A network in general comprises one or more devices, for example, clients and servers, where the devices are in communication with each other. Computer networks are utilized for the streaming of videos, i.e., via encoders and decoders. Live video streaming has enabled the sharing of video instant and provides a platform that allows users to broadcast live video content using a camera and a computer through the Internet, and viewers to play the content via the web, mobile devices, such as, iOS and Android apps. Exemplary cloud-based broadcasting and video content management platforms provide—once the live video signal has been transmitted to the cloud—effective management and delivery of live video. Technology such as adaptive video quality effect live streaming of Internet content delivered in real-time. Live internet streaming requires a form of source media (e.g. a video camera, an audio interface, screen capture software), an encoder to digitize the content, a media publisher, and a content delivery network to distribute and deliver the content. Additionally, streaming media may be defined as multimedia that is constantly received by and presented to an end-user while being delivered by a provider.

SUMMARY

Embodiments may include methods, systems, and devices where, for example, a device embodiment may include a processor and addressable memory, the addressable memory comprising a set of one or more rules, where the device is in communication with a first user equipment having a processor and addressable memory and a second user equipment having a processor and addressable memory, and where the processor may be configured to: receive, from the first user equipment, a request to dispatch the second user equipment, where the request for dispatch may comprise a location for video data streaming; determine a set of one or more user equipment to send the received request to, based on the received request and connectivity status, where the connectivity status of the set of one or more user equipment may be determined based on accessing a data store comprising associated keep alive messages and associated statuses for each user equipment; select the second user equipment from the determined set of one or more user equipment based on at least one of: a received acknowledgement message from the second user equipment that the request was accepted and a set of criteria, where the set of criteria is determined based on available operators within travel range and previous ranking of each operator; and transmit streamed video data from the second user equipment to the first user equipment, where the streamed video data may be transmitted once recording has initiated by the second user equipment based on the second user equipment being in the location specified by the received request from the first user equipment.

Optionally, the determination of the set of criteria may be further based on obtaining a provider coverage information for the location specified by the received request from the first user equipment. Additionally, the received request to dispatch may further comprise at least one of: an estimated video quality threshold, an estimated time of arrival, and an estimated value. In one embodiment, the associated keep alive message may comprise an authentication token and the associated statuses may comprise diagnostic information. The associated keep alive messages and associated statuses may also be received as an encrypted message and decrypted by the computing device. Another exemplary embodiment may be where the processor is configured to extract a unique identification (ID) from the decrypted associated keep alive messages and associated statuses for a user equipment based on the authentication token having been successfully decrypted. In addition, the processor of the device may utilize a separate process to return a status update immediately to the user equipment of the set of one or more user equipment that sent the associated keep alive messages and associated statuses. Further, the processor of the device may be configured to return the status update based on whether the authentication token is found to be valid via a check of a client blacklist table. Optionally, the device may further comprise a second data store for logging a set of associated information for each user equipment. In one embodiment, the device may be between the first user equipment and the second user equipment, thereby the device may be in communication with the first user equipment and the second user equipment via a set of communication channels.

Embodiments include methods, systems, and devices where, for example a method embodiment may include the steps of: (a) sending, by a first user equipment having a processor and addressable memory, a request to a computing device having a processor and addressable memory, for dispatching a second user equipment having a processor and addressable memory, where the request for dispatching an operator may comprise a location for video data streaming; (b) determining, by the computing device, a set of one or more user equipment to send the request to, the determining based on the received request and connectivity status, where the connectivity status of the set of one or more user equipment may be determined based on accessing a data store comprising associated keep alive messages and associated statuses for each user equipment; (c) selecting, by the computing device, the second user equipment from the determined set of one or more user equipment based on at least one of: a received acknowledgement message from the second user equipment that the request was accepted and a set of criteria, where the set of criteria may be determined based on available operators within travel range and previous ranking of each operator; and (d) streaming, by the second user equipment to the first user equipment, video data being recorded by the second user equipment once the second user equipment is in the location specified by the first user equipment.

Optionally, the determining the set of criteria may be further based on obtaining a provider coverage information for the location specified by the received request from the first user equipment. In some embodiments, the request for dispatching an operator may further comprise at least one of: an estimated video quality threshold, an estimated time of arrival, and an estimated value. Optionally, the associated keep alive message may comprise an authentication token and the associated statuses may comprise diagnostic information.

In some embodiments the method may further include the step of: decrypting, by the computing device, the authentication token received as an encrypted message; and extracting, by the computing device, a unique identification (ID) associated with each user equipment of the set of one or more user equipment. Additionally, the method may include the step of returning, by the computing device, a status update immediately to each user equipment of the set of one or more user equipment based on a successful decryption of the authentication token and whether the authentication token is found to be valid via a check of a client blacklist table. In one embodiment, the computing device may be between the first user equipment and a second user equipment, thereby the computing device may be in communication with the first user equipment and the second user equipment via a set of communication channels.

Other embodiments include methods, systems, and devices where, for example a system embodiment may include: (i) a computing device, (ii) a first user equipment, and (iii) a second user equipment; where the first user equipment comprises a processor and addressable memory, the processor configured to: send a request to the computing device for dispatching another user equipment, where the request for dispatching is a request for video data streaming; where the computing device comprises a processor and addressable memory, the processor configured to: (a) receive, from the first user equipment, the request to dispatch another user equipment, where the request for dispatch comprises a location for video data streaming; (b) determine a set of one or more user equipment to send the received request to, the determination based on the received request and connectivity status, where the connectivity status of the set of one or more user equipment is determined based on accessing a data store comprising associated keep alive messages and associated statuses for each user equipment; (c) select the second user equipment from the determined set of one or more user equipment based on at least one of: a received acknowledgement message from the second user equipment that the request was accepted and a set of criteria, where the set of criteria is determined based on available operators within travel range and previous ranking of each operator; and where the second user equipment comprises a processor and addressable memory, the processor configured to: stream video data being recorded by the second user equipment once the second user equipment is in the location specified by the received request from the first user equipment.

BRIEF DESCRIPTION OF THE DRAWINGS

Embodiments are illustrated by way of example and not limitation in the figures of the accompanying drawing, and in which:

FIG. 3B depicts a function block diagram of the embodiment having a communication medium;

DETAILED DESCRIPTION

Figure 1:
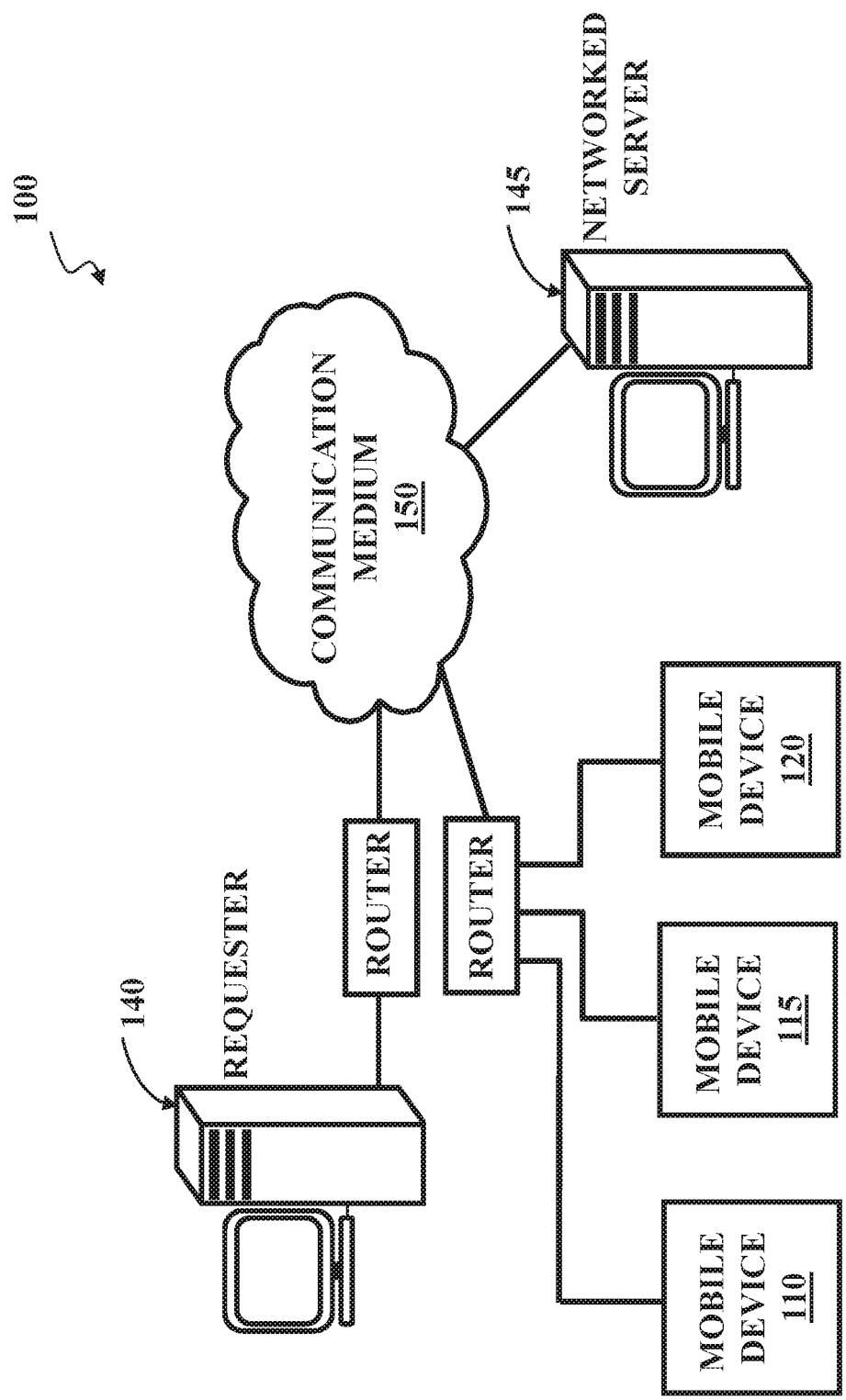
FIG. 1 depicts an on-demand live streaming video computing system where a requester and a number of devices are in communication with a networked server.

Exemplary embodiments of the live video and audio streaming from a remote location comprise a requester device comprising an operating system and a data store, an operator device comprising an operating system and a data store, and a computing device comprising an operating system and a data store. The system effects streaming of live video and audio based on a request received from a consumer or requester device. The devices may comprise an application program running on the operating system to process streaming of video and audio captured by the operator device. The operator device may then communicate the video and audio stream along with a set of associated information to the requester device which will then be able to view the video live. The operator device may transmit the video and associated information to the requester device via the server computing device and via, for example, wireless Wi-Fi®, wireless local area network (WLAN), or other wireless networks with broadcast methods such as Long Term Evolution (LTE), Bluetooth, and/or any other hardware or software radio broadcast methods. The server computing device may connect and work with any such devices that may use LTE or WLAN, for example, mobile phones, specifically smartphones, personal computers, video game consoles, tablets, televisions, and/or digital cameras, to connect to a network resource such as the Internet via wired or wireless communication. In one embodiment, the system may manage a large number of devices in a crowded environment, so as to process multiple requests from consumers, where each of the multiple requests may specify a location that is needed to be travelled to and capture live or recorded video and/or audio at that location. Embodiments of the computing system may determine a ranking of operator devices based on pulling a provider coverage map for a specified job location, assigning a score to each responding operator device based on the provider coverage map and then select a set of available operators within driving or travel range of the job location. Other embodiments may take into consideration the estimated time of arrival for the operator into the ranking or scoring or operator devices. In one embodiment, the signal strength history from previous users in the area may be used to rank and score each responding operator or in addition to or instead of the coverage map—in scenarios where such coverage map is not available. Accordingly, the system may rank operator device users based on distance, rating, and provider score in order to dispatch the highest ranked operator first.

The server computing device may collect and store a set of associated information for each operator via, for example, being granted access to the camera related data of the device. Additionally, access to the GPS and Bluetooth components may be incorporated so as to allow the application running on the operating system of the device to collect and store the relevant information associated with each operator. That is, upon the launch and execution of the application program, the application program may begin to pull information from the device's many components so as to determine a set of criteria needed by the server computing device to assign requests to the different devices, i.e., operators. The server computing device may also perform a GPS verification of where the operator is located in view of the requested location where the requester desires the video and audio stream to be taken from. The server computing device may use different means, for example, a provider coverage map of the location and/or an estimated signal strength of the operator at the location, to determine a ranking which would constitute a scoring system for which operator may receive the request. Alternatively, the location information may be used to determine which operator may receive the request first as part of the first group of operators able to satisfy the request. Additionally, the operator device may have an associated customer qualification for the particular dispatch. In one embodiment, the operator's customer qualification and the associated information, for example, comprising: GPS location, Camera capability, phone upload speed, coverage map, and other optional data gathered may be transmitted via the aforementioned mediums to the server computing device for processing.

In one embodiment of the system for live video and audio streaming from a remote location, the system may employ a 'keep alive' messaging feature where a scalable method for securely tracking connectivity status, for example, remote client connectivity, may be executed with minimal and selective database access. In one exemplary embodiment, the system utilizes computing devices and because of a peer-to-peer nature of the application, an updated list of clients needs to be available for dispatch. Additionally, the system may need to determine when a client, i.e., operator, has a connection issue in order to ensure quality of service for the service requesters. The exemplary scenario where an operator may be asked to travel to a location while the requester is no longer available needs to be avoided and likewise, an exemplary scenario where the requester's live video and audio feed is terminated or the operator has disappeared, e.g., lost connection. In the exemplary embodiment of the system for live video and audio streaming from a remote location, the system may implement a communication scheme where each user or client, whether an operator or requester, transmits a heartbeat signal to the server computing device. The heartbeat signal may comprise an authentication token and diagnostic information, for example, GPS, battery %, carrier, connection type, etc.

In one embodiment of the system for live video and audio streaming from a remote location, a proxy server may be used in order to receive all requests, i.e., all requests will pass through the proxy server. The proxy server may perform throttling by allowing any one client to send only N number of requests per minute, or any predetermined unit of time. A heart rate may be determined as the rate at which heartbeat requests are sent. The heart rate may be made configurable and accordingly, the throttle on the proxy server may be adjusted to a sane/well-balanced limit based on the heart rate. In this embodiment, the proxy server may block any client which may be exceeding the throttle limit, thereby providing security by ensuring that any denial of service (DoS) attack on the API may not be able to hit the application servers more than a few times.

In the exemplary embodiment comprising the server computing device, the server may first receive the authentication token and decrypt the authentication token as part of the heartbeat. The authentication token may be comprised of several pieces of hashed information, for example, the client's account identification (ID). Accordingly, the client ID may be extracted from the decrypted authentication token and once the authentication token has been successfully decrypted and found to be valid, the server computing device may return a status update, for example, "200 OK" immediately (i.e., in real-time) to the client and close the connection from the client. This will allow for freeing up of the connection as soon as possible and may keep latency low in order to allow for handling of many more connections per heartbeat server. The authentication token may also be compared against a black list, and in the event that an entry exists for the authentication token in the blacklist, a status, for example, "403 forbidden" may be returned to the client, denying the client access. A cache comprising authentication tokens may be checked to see if a record for the authentication token passed in by the client exists, thereby speeding up the processing of each authentication token. The cache may be used to avoid hitting the client account database on every request. Since heartbeats may be sent frequently, therefore, database access performed on every request, the server computing device may allow for scaling and increase processing speed in conjunction with the rest of the application.

If the cache record does not exist, the client ID extracted from a previous step may be used to query the client database for the client account data. Attributes of the client account may also be checked to ensure that the account is valid/in good standing/or allowed to proceed. If the attributes do not pass this check, the client may then be placed on the blacklist and a status "403 forbidden" (Deny) may be returned to the client. If the attributes pass this check, the client record may be written to the cache and a status "200 OK" (Allow) may be returned to the client. Details of the heartbeat and client account may be logged to a persistent data store in either case for future processing and usage.

If the cache record does exist, the client account data may be pulled from the cache. Attributes of the client account may be checked to ensure that the account is valid/in good standing/allowed to proceed. If the attributes do not pass this check, the client may be placed on the black list, the client cache record will be removed, and a status "403 forbidden" (Deny) may be returned to the client. If the attributes pass this check, the client record may be updated in the cache and a status "200 OK" (Allow) may be returned to the client. Details of the heartbeat and client account may be logged to a persistent data store in either case.

In an exemplary computing system embodiment, once the server computing device receives the request from a consumer, i.e., requester, and associated information, it may then execute a series of steps in order to process the received information. The server computing device may execute a script running on the operating system to launch a computer implemented method operating a number of components configured to determine the best suited operator available for the requested job, including, but not limited to, a ranking that may be determined based on a number of criterions. In one exemplary embodiment, the consumer may send, via their user equipment, e.g., personal computer, tablet, or mobile device, a request to the server computing device for dispatching an operator of another user equipment, where the request for dispatching the operator comprises a location, a video quality, estimated time of arrival, and price, specified by the consumer or determined by the system. Once the request is received, the server computing device may then select a set of operators from amongst a set of available operators of user equipment to send the request to. The server computing device may make the selection based on the received request and a set of criteria, where the set of criteria is determined based on at least one of, for example, obtaining information regarding the estimate time of arrival at the requested location by the operator which may itself include the speed of travel capability, a provider coverage map for the location in the request, a set of attributes associated with the device of the operator, and the available operators that are within driving range—whether that range is predetermined by the requester, the operator, or the server computing device. Additionally, the server computing device may determine the set of criteria based on previous rankings of the set of operators being considered, a number of qualifications associated with the operator, and current location affecting the estimated time of arrival to the destination.

Once the set of operators to whom the request will be sent is determined by the server computing device according to the aforementioned criteria, the request may be sent to the operators to determine which of the operators accept the request and send an acknowledgement to the server computing device, to be forwarded to the requesting consumer, that the request was accepted. Once the connection is made, the server computing device may effect the streaming of live video once the user equipment is in the location specified by the requester and recording has started. The server computing device may determine whether the streaming may begin by checking to see if the operator is within a predetermined proximity of the location from which the streaming is requested. That is, the operator may not go live with the video streaming until they have reached the location or are within an acceptable distance of the location, where the acceptable distance may be predefined by the server computing device.

The server computing device may execute a series of steps to: a) process multiple requests simultaneously, each of the multiple requests specifying a point of interest (POI) location that is within a geographic region; b) determine, while the requests are outstanding, a set of potential operators at or about the geographic region who are capable of performing the request and within a specified period of time, i.e., able to get to the location with an acceptable estimated time of arrival; c) decrease the period of time necessary to perform and fulfill the request while increasing the likelihood that the outcome of the video stream is at or above an expected threshold by the requester; and d) reduce any associated costs to the requester. Optionally, the server computing device may perform the step of ensuring an operator is selected for each of the multiple requests. Accordingly, the server computing device may determine an optimized process for the live streaming of video from an operator to a requester for a specified location.

The embodiments of the computing system utilize a data store, for example, a database, where related information is stored and assigned to each operator. The database may store the data being streamed from the selected operator to the requester and maintain control over the media created and outputted on the device of the requester. In an embodiment where a live stream is not available, the computing system may instead record the video to the operator device to be streamed to the consumer at a later time. Each operator may be assigned a unique identifier by the server computing device so as to identify the transmitted data to the requester's computing device. The token may then enable the requester to provide instructions and/or directly operate the operator's device in order to enable control of the direction and/or position of the device, where the requester may be essentially present and instructing the view that is streamed and outputted to the requester's computing device.

In one embodiment, the medium for allowing a separate communication path may be done via setting up a separate channel for voice communication. In this exemplary embodiment, a common-channel signaling may be utilized so the transmission of signaling information (control information) may be effected on a separate channel from the data, and, more specifically, where the signaling channel may control data channel communication and a voice channel may be used for direct communication between the requester and operator. According to this embodiment, while the data may be transmitted from the operator device to the requester device via the server computing device, the voice communication medium may be directly established between the two devices. Alternatively, in one scenario, the data may be transmitted directly between the two devices and the voice communication may be transmitted first to a central server that may then broadcast the voice to one or more other devices. As such, while analog transmission that is the transfer of a continuously varying analog signal over an analog channel is maintained on one channel, digital communications that is the transfer of discrete messages over a digital or an analog channel may be maintained on a different channel. That is, embodiments of the live video and audio streaming from a remote location may implement a two-channel communication method where while the video may be transmitted or broadcasted on one channel either directly between two devices, the requestor device and operator device, the audio may be transmitted or broadcasted on a separate channel either directly between two devices. Accordingly, the audio may be transmitted directly and the video to the server computing device for processing before then being transmitted to the other device or the audio may be transmitted to the server device for processing before then being transmitted to the other device while the video may be transmitted directly between the devices.

The exemplary server computing device may create a system where an on-demand video streaming service is offered. For example, a server computing device may maintain a queue that comprises a plurality of operator tokens/identifiers corresponding to a plurality of operators. Each operator identifier may be added to the queue in response to receiving a request for service from a corresponding requester. The server computing device may facilitate the exchange of information between a requester and operator where the requester may receive a set of offers from a plurality of operator devices that the one or more operators are available to provide service to the requester. In response to receiving the offers, the requester computing device or alternatively, the server computing device, may select an operator from the queue to assign a corresponding requester to the operator based, at least in part, on specified on-demand service locations corresponding to the plurality of requester's requests and a current location of the operator. Optionally, the server computing device may verify the current location of the operator just before streaming is started by validating the GPS location against a globally unique map created from a number of POIs and road maps.

A system and method for arranging a video streaming service may be created based on a server computing device receiving a request for video streaming at a specified location from a computing device of a provider. In response to the received request, the server computing device may determine a plurality of operators that maintain a capability to provide video streaming for the first requester via determining a set of operators that are each within a predetermined distance from the specified location and that are not currently engaged with another requester. Accordingly, the determining of the set of operators may be based on a respective destination location that is within a threshold distance or threshold estimated travel time from the specified location by the requester. The server may select an operator from the plurality of operators to provide the video stream for the requester so that video quality and video length satisfy the requirements set forth by the requester. In one embodiment, the requester's media player may begin to play the data (such as the video) before the entire file has been transmitted; that is live streaming, which refers to content delivered live over the Internet, may be delivered via an encoder to digitize the content. Optionally, the video stream may be compressed using a video codec as is well known in the art.

FIG. 1 depicts an on-demand live streaming video computing system 100 where computing device of a requesting user, i.e., requester 140 and a number of devices, i.e., providers or operators 110, 115, 120, are in communication with a networked server 145. In one embodiment, the networked server 145 may be accessible via the internet and so the devices may push their availability for service and related data associated with the device via a router to the networked server 145. Once the networked server 145 receives and processes the related data from the mobile devices of the operators 110, 115, 120, the networked server 145 may then perform the disclosed steps. Subsequently, the requester 140 may be in communication with the networked server 145 via a communication medium 150, and they may communicate with the devices. That is, once the networked server 145 receives a request from the requester 140, the networked server 145 may determine which users should be receiving the request—this may be done based on the related data they have sent to the networked server 145. For example, devices of the operators 110, 115, 120 may provide information about their battery life (or remaining battery power), location information, speed of travel capability, and camera capability to the networked server 145. Once determined that the users of a first operator device 115 and a second operator device 120 are capable of carrying out the request received from the requester 140, the networked server 145 may then provide the list of users (i.e., operators) so that the requester may select which operator they want selected. Alternatively, the networked server 145 may determine the best fit for the request based on the aforementioned criteria and send a request to the first operator device 115 and the second operator device 120 to see if they are interested in fulfilling the request. Optionally, the networked server 145 may provide a scoring table to the requester to help the requester decide which operator to select from amongst a list of qualified operators. This may be done, for example, via using a provider coverage map overlay method disclosed herein.

Typically, the server may perform assigning of a unique ID to each transaction in order to track the users and their potential communication. In one embodiment, the ID may be for purposes of keeping a log of communications and also determining a cost associated with each transaction. Additionally, this function may be accomplished in real-time or near real-time by the server computing device or at a later time when information is transmitted from the devices and internet access is available. Optionally, in an environment where an internet connection is not available, other modes of validation may be used to validate the transactions, such as the application running locally on the device.

The networked server computing device 145 may be operably coupled to a WAN network 150 and may communicate with other devices via various means, including, for example, via wired or wireless network segments, such as radio frequency, infrared, and/or microwave. In some embodiments various protocols and programming languages may also be used, such as transmission control protocol (TCP) over Internet Protocol (IP)—TCP/IP, User Datagram Protocol (UDP) with multi-cast data communication plans, Real Time Protocol (RTP) for data streaming, hypertext transfer protocol (HTTP) with hypertext markup language (HTML), simple object access protocol (SOAP) with extensible markup language (XML), and other communication means adapted to operably connect the networked computing device 145 with the other devices within the computing system 100.

Figure 2:
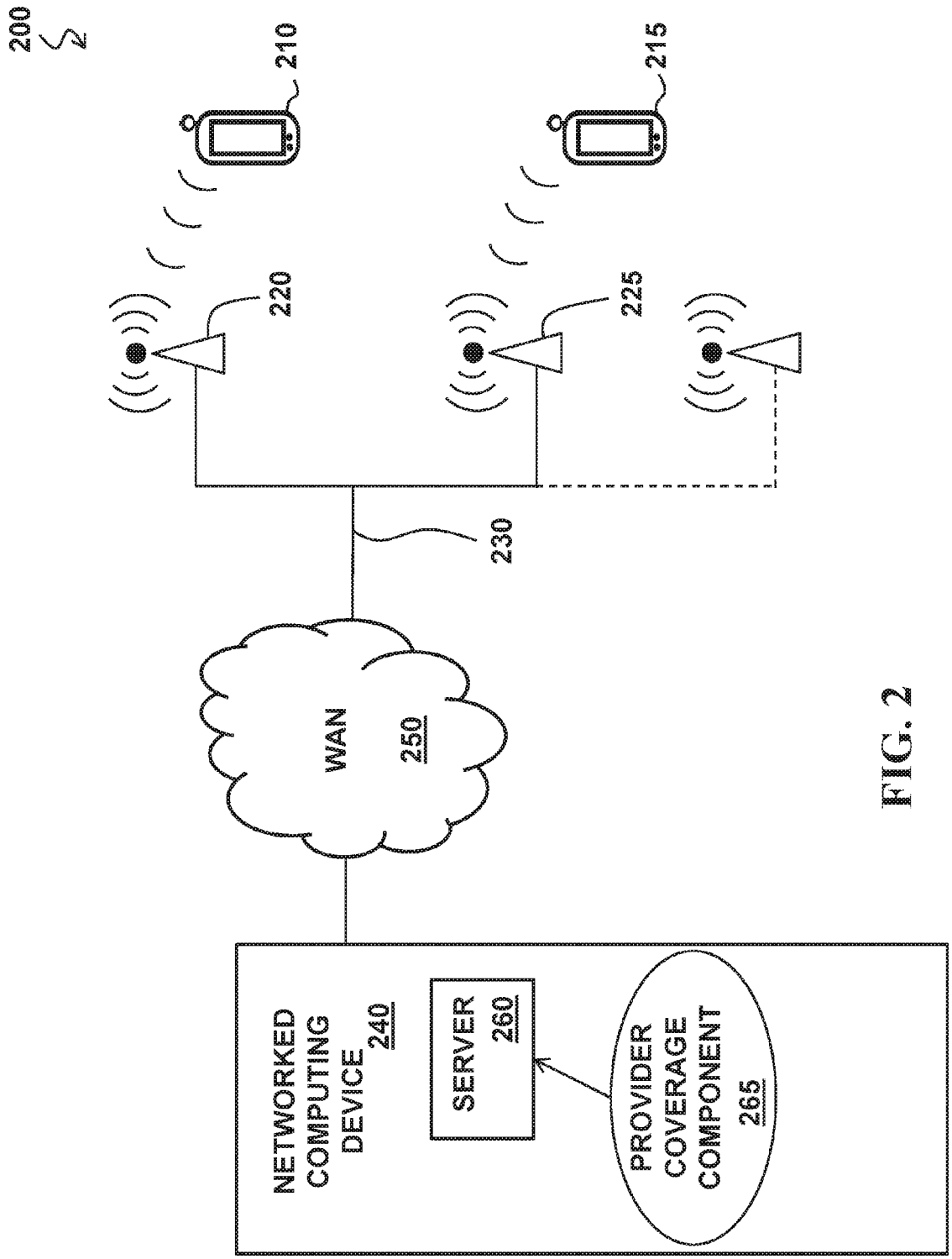
FIG. 2 depicts an exemplary embodiment of a computing system that includes a user equipment (UE), a plurality of wireless local area network devices, and a networked computing device.

FIG. 2 depicts an exemplary embodiment of a computing system 200 that includes a user equipment (UE), e.g., mobile devices 210, 215, a plurality of wireless local area network devices (WLANs) 220, 225, a networked computing device 240 that may host a virtual network computing server 260, and a Wide Area Network (WAN) 250 that may provide access to the Internet or other content sources. In some embodiments, for example, a connection 230 may be established between the WLANs 220, 225 and the networked computing device 240. In some embodiments, the networked computing device 240 may be connected to the WAN 250 and have access to the Internet. Additionally, the computing system 200 depicts the networked computing device 240 being outside of a network and the mobile devices 210, 215 may be in communication with the server 260 running on the networked computing device 240 via the WAN 250. The server 260 running on the networked computing device 240 may have the ability to use, for example, a provider coverage component 265 to determine whether the provider mobile device may have coverage for that particular provider at the specified location by the requester. This may be facilitated via the server 260 and provider coverage component 265 communicating with mobile devices 210, 215 to determine their status, for example, the company providing coverage, the signal strength, and anticipated signal strength at the specified location. Other criteria may be employed where information relating to the mobile devices 210, 215 may be used in lieu of or in addition to the provider coverage map, thereby allowing the networked computing device 240 to determine which of the mobile devices 210, 215 may be more suited for the particular request.

In an embodiment comprising multiple UEs, e.g., a first mobile device 210 and a second mobile device 215, the mobile devices 210, 215 may execute a set of one or more applications via an operating system (OS) that may be running on the device. The applications may be in communication with the networked computing device 240 in real-time or near real-time, e.g., the application running on the first mobile device 210 and the application running on the second mobile device 215—via the operating system—and simultaneously transmit relevant information associated with each request by the requester and availability of the provider to the server. The server then, according to whether the steps of identifying potential users were identified that have the ability, e.g., meet certain thresholds, to carry out the request successfully, populates a list of providers to the requester. That is, the rules which have been defined were executed and the networked computing device 240 determined, based on a set of information, for example, provider coverage map, estimated time of arrival, and location information, which providers are available and capable of providing the desired video streaming quality at the desired location. In one embodiment, the desired video stream may be transmitted to one or more consumer devices simultaneously, thereby effecting the broadcasting of such stream to multiple devices.

The application may be executed in an environment where data that may include streaming video data, may be transmitted to and received by a computing device. The exemplary mobile devices 210, 215 may perform error correction and error concealment for the video data stream and other associated data being transmitted to the networked computing device 240, thereby allowing the user to transmit over any connection speed. The application may further provide a convenient user interface to view the video stream in which they have the ability to request certain actions from the provider.

Figure 3A:
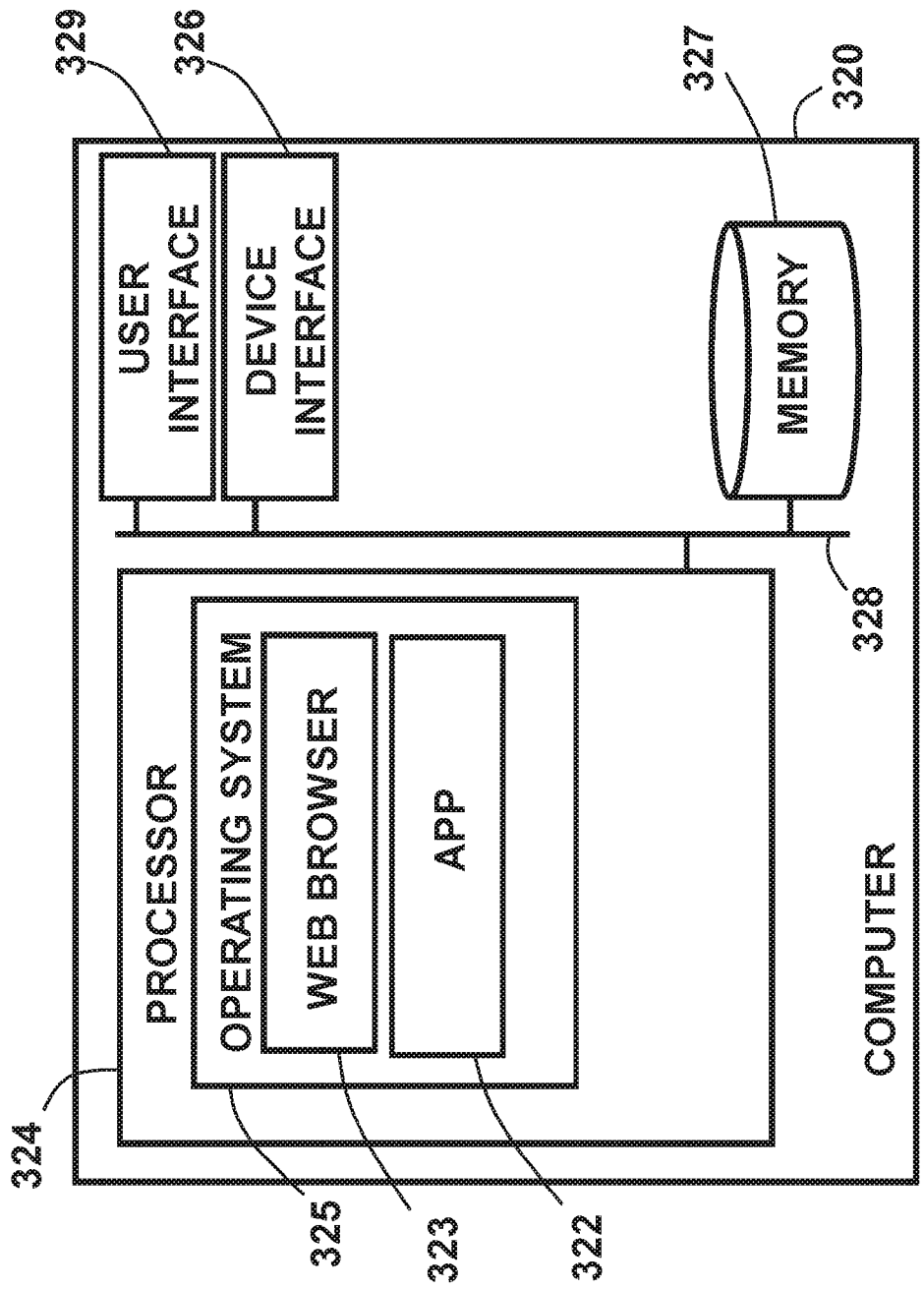
FIG. 3A illustrates an exemplary top level functional block diagram of a computing device embodiment.

FIG. 3A illustrates an exemplary top level functional block diagram of a computing device embodiment 300. The exemplary operating environment is shown as a computing device 320 comprising a processor 324, such as a central processing unit (CPU), addressable memory 327, an external device interface 326, e.g., an optional universal serial bus port and related processing, and/or a Communication or Network Communication port and related processing, and an optional user interface 329, e.g., an array of status lights and one or more toggle switches, and/or a display, and/or a keyboard and/or a pointer-mouse system and/or a touch screen. Optionally, the addressable memory may, for example, be: flash memory, EPROM, and/or a disk drive or other hard drive. These elements may be in communication with one another via a data bus 328, and via an operating system 325 such as one supporting a web browser 323 and applications 322, the processor 324 may be configured to execute steps of a process for determining the best match for a request received from a consumer/user requester where the consumer/user is requesting live video stream from a specified location and in conjunction with a set of other criteria.

FIG. 3B depicts a function block diagram 340 of the embodiment having a communication medium 350 for allowing separate communication paths for voice and data. In this exemplary embodiment, a plurality of communication channel for signaling audio and video data transmission may be employed. The audio/video data component of the first device 310 may be in directly communication with the audio/video data component of the second device 315 via two separate communication channels 341, 342. The audio/video data component of the first device 310 may also be in communication with the server computing device 360 via two separate communication channels 344, 345. Additionally, the audio/video data component of the second device 315 may also be in communication with the server computing device 360 via two separate communication channels 347, 348. Accordingly, communication of audio data may be possible on a separate channel from the video data, and, more specifically, where the signaling channel may control different channel communications. According to this embodiment, while the data may be transmitted from the operator device, e.g., second device 315 to the requester device, e.g., first device 310 via the server computing device 360, the voice communication medium may be directly established between the two devices via the communication channels 341, 342. Combinations of different communication methods may be achieved via the exemplary embodiment.

Figure 4:
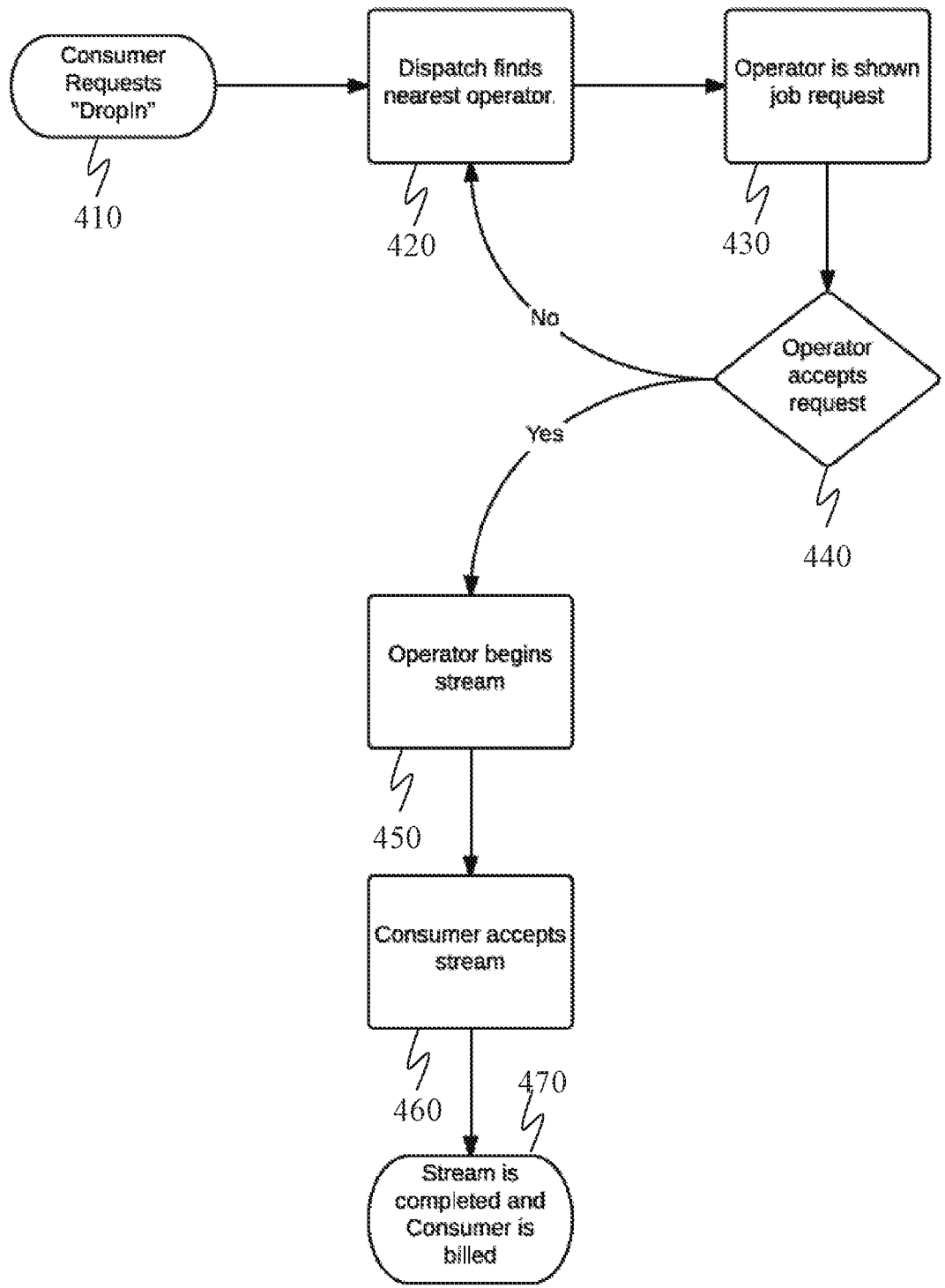
FIG. 4 is a flow chart of an exemplary top level functional process of a server computing device embodiment.

FIG. 4 is a flow chart of an exemplary top level functional process of a server computing device embodiment that may include an exemplary method of implementation of a server computing device that may determine an operator to pair with a requester for satisfying a specific request, from the requester, for live video streaming at a specified location. The exemplary method of the system and associated computing devices may comprise the following steps: a consumer/user requests the aforementioned services by launching an application—either via an app running on a mobile device operation system or a web browser (step 410); the launched application dispatch finds an operator with the best ranking according to the criteria disclosed herein (step 420); the operator may then be shown the job request and given an opportunity to accept or reject the job (step 430); if the operator accepts the request (step 440), then the operator may begin streaming the live video as soon as they reach the specified location (step 450); if the operator rejects the request (step 440), then the application may determine a second operator suitable for the request and send the job request to (step 420); upon acceptance and once the operator begins streaming the live video, the consumer/user may accept the stream and begin viewing the live stream on their computing device (step 460); and, when the stream is completed, the system may determine the billable amount and then the consumer may be billed (step 470).

Figure 5:
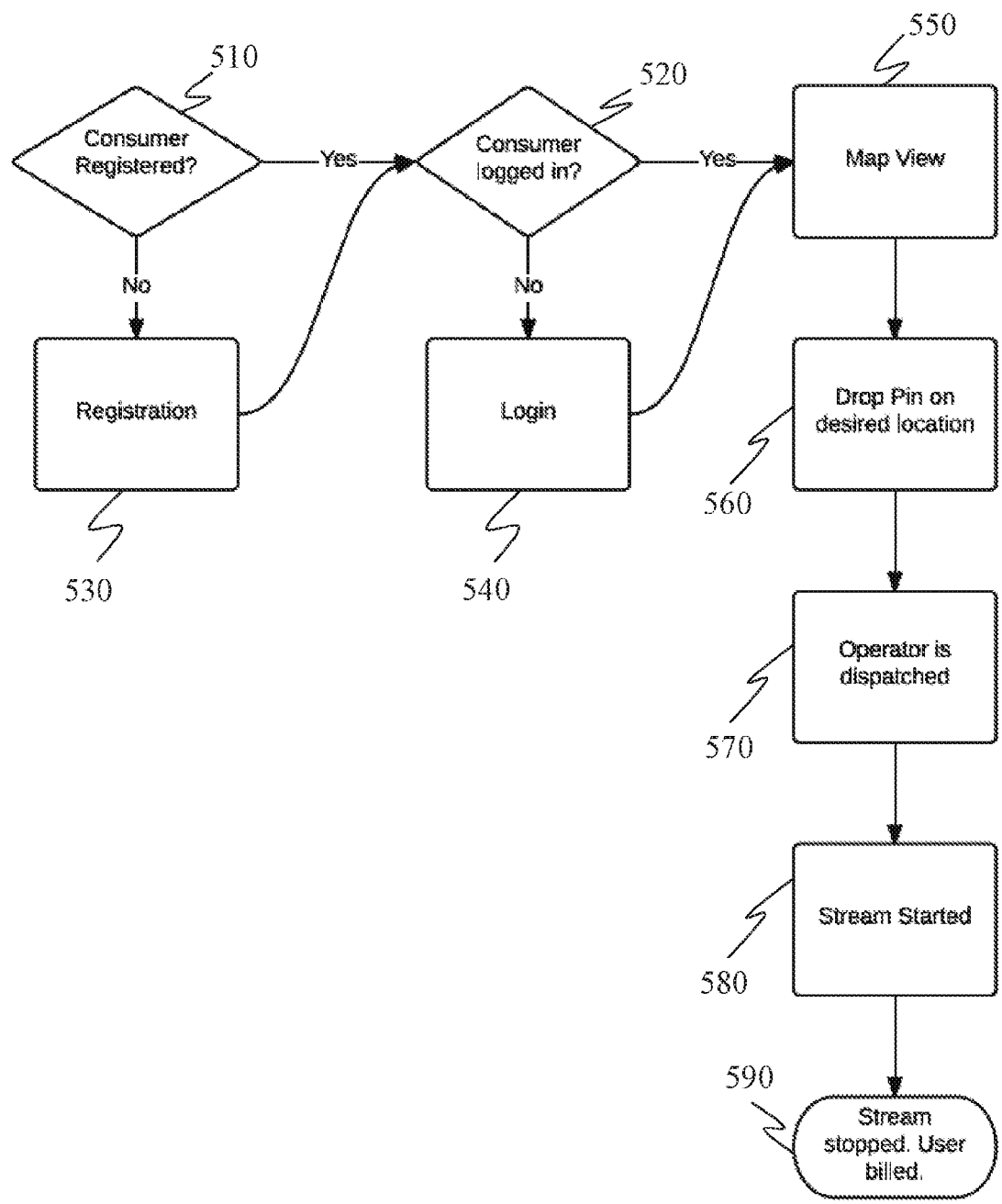
FIG. 5 is a flow chart of an exemplary top level functional process of a server computing device embodiment.

FIG. 5 is a flow chart of an exemplary top level functional process of a server computing device embodiment that may include an exemplary method of implementation of a server computing device that determines a consumer data flow for requesting live video streaming at a specified location. The exemplary method of the system and associated computing devices may comprise the following steps: determine whether a consumer is registered (step 510); if the consumer is registered, then the consumer may be logged in upon verification of their login information (step 520); if the consumer is not already registered, then they need to go through the registration process (step 530); once the consumer is logged in (step 540), they may view a screen showing the map of potential areas they can request the live stream for (step 550); subsequently, the consumer may drop a pin on the desired location on the map view (step 560), then, based on the methods described herein, the operator is dispatched (step 570); the next step would then be to have the streaming started between the operator and consumer/user requesting the service (step 580); and, when the stream is completed, the system may stop the stream and bill the consumer/user (step 590).

Figure 6:
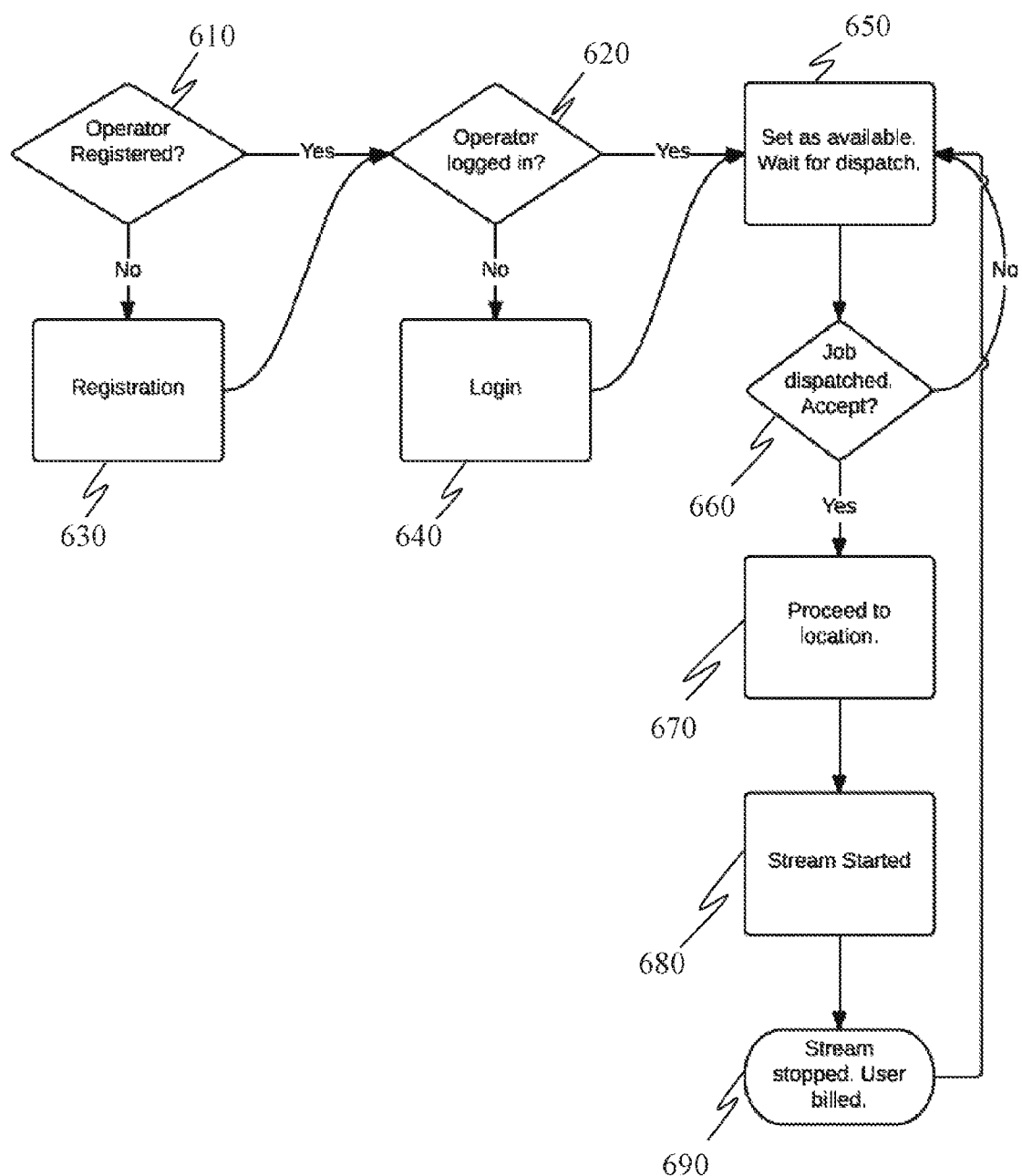
FIG. 6 is a flow chart of an exemplary top level functional process of a server computing device embodiment.

FIG. 6 is a flow chart of an exemplary top level functional process of a server computing device embodiment that may include an exemplary method of implementation of a server computing device that determines an operator data flow for responding to requests for live video streaming at a specified location. The exemplary method of the system and associated computing devices may comprise the following steps: determine whether an operator is registered (step 610); if the operator is registered, then the operator is logged in upon verification of their login information (step 620); if the operator is not already registered, then they need to go through the registration process (step 630); once the operator is logged in (step 640), they may request that they be set as an available operator and wait for dispatch to travel to a location and live stream video (step 650); then the operator may accept a job dispatched for a desired location by the requester (step 660), subsequently, based on the location received, the operator proceeds to that location (step 670); the next step would then be to have the streaming started between the operator and consumer/user (step 680); and, when the stream is completed, the system stops the stream and bills the consumer/user (step 690).

Figure 7:
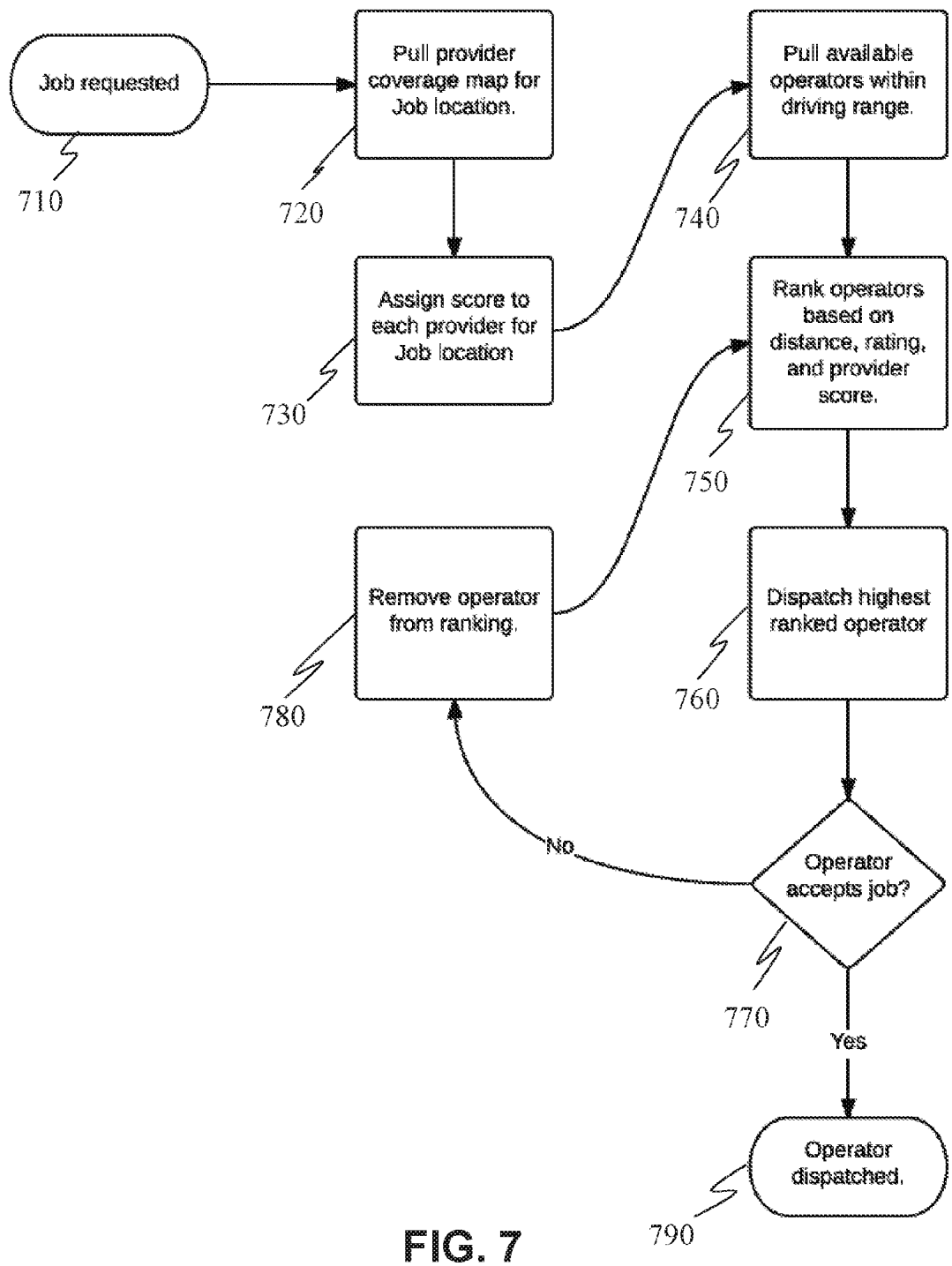
FIG. 7 is a flow chart of an exemplary top level functional process of a server computing device embodiment.

FIG. 7 is a flow chart of an exemplary top level functional process of a server computing device embodiment that may include an exemplary method of implementation of a server computing device that determines a dispatching data flow after receiving a job request from a consumer or user and a responder responding to the requests for live video streaming at a specified location. The exemplary method of the system and associated computing devices may comprise the following steps: receive a job request (step 710); the server computing device may then pull a provider coverage information for the job location received as part of the job request (step 720); the server computing device may then assign a score to each provider for the job location (step 730); the server computing device may then pull the available operators within a driving range of the received job location (step 740), the server computing device may then rank operators based on distance, rating, and provider score for dispatch to travel to a location and live stream video (step 750); according to the step 750, the server computing device may then dispatch the highest ranked operator (step 760), then, based on whether the operator accepts the job (step 770); the server computing device may then remove the operator from ranking (step 780); and, once the operator has accepted the job, the server computing device may then dispatch the operator (step 790).

Figure 8:
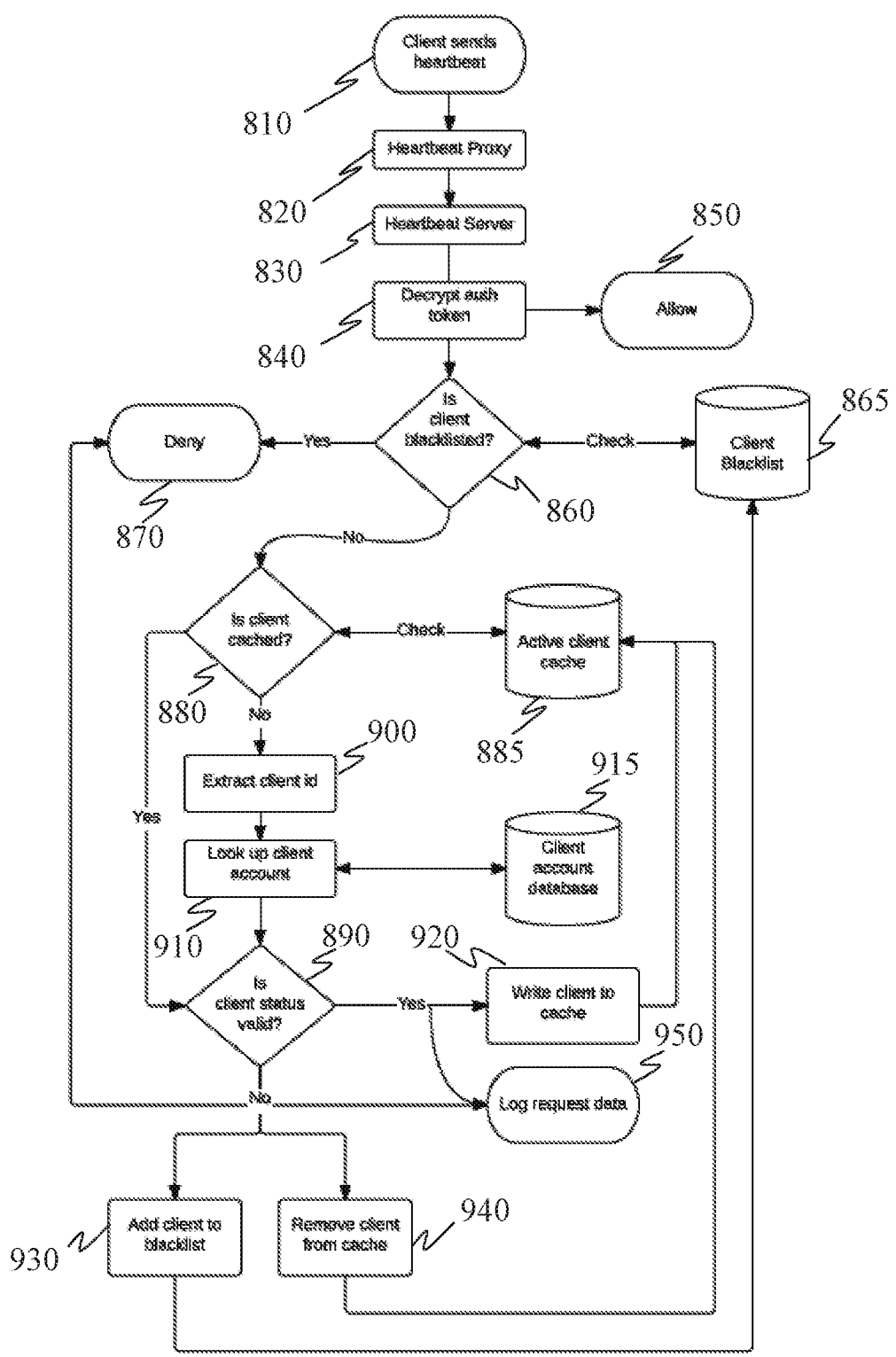
FIG. 8 is a flow chart of an exemplary top level functional process of a server computing device embodiment.

FIG. 8 is a flow chart of an exemplary top level functional process of a server computing device embodiment that may include an exemplary method of implementation of a server computing device 800 that utilizes a cache for client account information for performing 'keep alive' messages or signals. In this embodiment, the client, either requester or operator, may send heartbeat signals to the server computing device (step 810). The heartbeat may then be received at the heartbeat proxy (step 820) and then sent to the heartbeat server (step 830) which may then decrypt the authentication token (step 840). If the authentication token is verified, it may then be allowed to move to the server (step 850). If the authentication token is determined to be blacklisted (step 860), by checking a client blacklist persistent store (865) then the heartbeat is denied (step 870); if the authentication token is not blacklisted, the server may check to see if the client is already cached (step 880) by checking an active client cache (885). If I it has already been cached, then the server may determine whether the client status is valid (step 890); and if client is not cached, the server may extract the client ID (step 900) and look up the client account (step 910) by way of checking the client account database (915). If the client status is valid, the server may write the client into the cache (step 920); and add the client information to the active client cache (885). If the client status is invalid, the server may add the client to a black list (step 930) by accessing the client blacklist (865) and/or remove the client from cache (step 940) by accessing the active client cache (885). Whether the client status is valid or invalid, the server may log the request data (step 950). In this embodiment, the active client account cache (885) may be the data source powering operator searches for dispatch.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A device comprising:
 a processor and addressable memory, the addressable memory comprising a set of one or more rules, wherein the device is in communication with a first user equipment having a processor and addressable memory and a second user equipment having a processor and addressable memory, and wherein the processor is configured to:
  receive, from the first user equipment, a request to dispatch the second user equipment, wherein the request for dispatch comprises a request for a multi-channel communication for a real-time video data streaming and real-time audio data streaming;
  determine a set of one or more user equipment to send the received request to, based on the received request and connectivity status, wherein the connectivity status of the set of one or more user equipment is determined based on accessing a data store comprising associated keep alive messages and associated statuses for each user equipment;
  generate a unique identifier associated with the first user equipment requesting video data streaming and audio data streaming;
  provide the request for dispatch and generated unique identifier to the set of one or more user equipment;
  select the second user equipment from the set of one or more user equipment based on a received acknowledgement message from the second user equipment that the request was accepted;
  establish a direct communication channel for transmitting audio data directly between the first user equipment and the second user equipment based on the generated unique identifier; and
  establish a separate communication channel for transmitting streamed video data from the second user equipment to the first user equipment, wherein the streamed video data is transmitted based on the generated unique identifier and via combining the direct communication channel and the separate communication channel.

2. The device of claim 1 wherein the received request to dispatch further comprises at least one of: an estimated video quality threshold and an estimated value.

3. The device of claim 1 wherein the associated keep alive message comprises an authentication token.

4. The device of claim 3 wherein the associated statuses comprises diagnostic information.

5. The device of claim 4 wherein the associated keep alive messages and associated statuses are received as an encrypted message and decrypted by the computing device.

6. The device of claim 5 wherein the processor is configured to extract a unique identification (ID) from the decrypted associated keep alive messages and associated statuses for a user equipment based on the authentication token having been successfully decrypted.

7. The device of claim 6 wherein the processor of the device utilizes a separate process to return a status update immediately to the user equipment of the set of one or more user equipment that sent the associated keep alive messages and associated statuses.

8. The device of claim 7 wherein the processor of the device is further configured to return the status update based on whether the authentication token is found to be valid via a check of a client blacklist table.

9. The device of claim 1 wherein the device further comprises a second data store for logging a set of associated information for each user equipment.

10. The device of claim 1 wherein the device is between the first user equipment and the second user equipment, thereby the device is in communication with the first user equipment and the second user equipment via a set of communication channels.

11. A method comprising:
sending, by a first user equipment having a processor and addressable memory, a request to a computing device having a processor and addressable memory, for dispatching a second user equipment having a processor and addressable memory, wherein the request for dispatching an operator comprises a request for multi-channel communication for real-time video data streaming and real-time audio data streaming;
determining, by the computing device, a set of one or more user equipment to send the request to, the determining based on the received request and connectivity status, wherein the connectivity status of the set of one or more user equipment is determined based on accessing a data store comprising associated keep alive messages and associated statuses for each user equipment;
generating, by the computing device, a unique identifier associated with the first user equipment requesting video data streaming and audio data streaming;
providing, by the computing device, the request for dispatch and generated unique identifier to the set of one or more user equipment;
selecting, by the computing device, the second user equipment from the set of one or more user equipment based on a received acknowledgement message from the second user equipment that the request was accepted;
establishing, by the computing device, a direct communication channel for transmitting audio data directly between the first user equipment and the second user equipment based on the generated unique identifier; and
establishing a separate communication channel for transmitting, by the second user equipment to the first user equipment, video data being recorded by the second user equipment based on the generated unique identifier and via combining the direct communication channel and the separate communication channel.

12. The method of claim 11 wherein the request for dispatching an operator further comprises at least one of: an estimated video quality threshold and an estimated value.

13. The method of claim 11 wherein the associated keep alive message comprises an authentication token.

14. The method of claim 13 wherein the associated statuses comprises diagnostic information.

15. The method of claim 14 further comprising:
decrypting, by the computing device, the authentication token received as an encrypted message; and
extracting, by the computing device, a unique identification (ID) associated with each user equipment of the set of one or more user equipment.

16. The method of claim 15 further comprising:
returning, by the computing device, a status update immediately to each user equipment of the set of one or more user equipment based on a successful decryption of the authentication token and whether the authentication token is found to be valid via a check of a client blacklist table.

17. The method of claim 11 wherein the computing device is between the first user equipment and a second user equipment, thereby the computing device is in communication with the first user equipment and the second user equipment via a set of communication channels.

18. A system comprising a computing device, a first user equipment, and a second user equipment;
wherein the first user equipment comprises a processor and addressable memory, the processor configured to:
send a request to the computing device for dispatching another user equipment, wherein the request for dispatching is a request for a multi-channel communication for a real-time video data streaming and real-time audio data streaming;
wherein the computing device comprises a processor and addressable memory, the processor configured to:
receive, from the first user equipment, the request to dispatch another user equipment;
determine a set of one or more user equipment to send the received request to, the determination based on the received request and connectivity status, wherein the connectivity status of the set of one or more user equipment is determined based on accessing a data store comprising associated keep alive messages and associated statuses for each user equipment;
generate a unique identifier associated with the first user equipment requesting video data streaming and audio data streaming;
provide the request for dispatch and generated unique identifier to the set of one or more user equipment;
select the second user equipment from the set of one or more user equipment based on a received acknowledgement message from the second user equipment that the request was accepted;
establish a direct communication channel for transmitting audio data directly between the first user equipment and the second user equipment based on the generated unique identifier; and
establish a separate communication channel for transmitting streamed video data from the second user equipment to the first user equipment, wherein the streamed video data is transmitted based on the generated unique identifier and via combining the direct communication channel and the separate communication channel; and
wherein the second user equipment comprises a processor and addressable memory, the processor configured to:
stream video data being recorded by the second user equipment.

* * * * *